US012276386B1

(12) United States Patent
Nam

(10) Patent No.: US 12,276,386 B1
(45) Date of Patent: Apr. 15, 2025

(54) LAMP FOR VEHICLE

(71) Applicant: HYUNDAI MOBIS CO., LTD., Seoul (KR)

(72) Inventor: Gyung Mok Nam, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/679,567

(22) Filed: May 31, 2024

(30) Foreign Application Priority Data

Mar. 26, 2024 (KR) ........................ 10-2024-0041357

(51) Int. Cl.

| | |
|---|---|
| ***F21S 41/27*** | (2018.01) |
| ***F21S 41/143*** | (2018.01) |
| ***F21S 41/151*** | (2018.01) |
| ***F21S 41/43*** | (2018.01) |
| ***F21W 102/10*** | (2018.01) |
| ***F21Y 113/00*** | (2016.01) |
| ***F21Y 115/10*** | (2016.01) |

(52) U.S. Cl.

CPC ............. *F21S 41/27* (2018.01); *F21S 41/143* (2018.01); *F21S 41/151* (2018.01); *F21S 41/43* (2018.01); *F21W 2102/10* (2018.01); *F21Y 2113/00* (2013.01); *F21Y 2115/10* (2016.08)

(58) Field of Classification Search

CPC .. F21S 41/27; F21S 41/25; F21S 41/26; F21S 41/24; F21S 41/143; F21S 41/151; F21S 41/41; F21S 43/239; F21S 43/15; F21S 41/141; F21Y 2115/10; F21Y 2113/10; F21W 2102/10

See application file for complete search history.

(56) References Cited

U.S. PATENT DOCUMENTS

| | | | | |
|---|---|---|---|---|
| 2012/0033441 | A1* | 2/2012 | Sousek | F21S 43/14 362/555 |
| 2015/0003094 | A1* | 1/2015 | Gebauer | G02B 6/002 362/511 |
| 2017/0276316 | A1* | 9/2017 | Kawabata | F21S 43/245 |
| 2019/0179157 | A1* | 6/2019 | Kang | G02B 27/0955 |

FOREIGN PATENT DOCUMENTS

| | | | | |
|---|---|---|---|---|
| CN | 112178585 A | * | 1/2021 | F21S 43/19 |

* cited by examiner

*Primary Examiner* — Erin Kryukova

(74) *Attorney, Agent, or Firm* — NovoTechIP International PLLC

(57) ABSTRACT

A lamp for a vehicle includes a light source assembly that includes a plurality of light sources that irradiates light, and a lens that outputs the light irradiated from the light source assembly forward, the lens includes a lens body having an incident surface, to which light is input from the light source assembly, and an emission surface, from which the light input to the incident surface is output, and a plurality of lens holes formed in the lens body, and that forms specific light distribution patterns with the light irradiated from the light source assembly. The lens body includes a guide area defined as an area located between adjacent lens holes, and that guides light traveling between the plurality of lens holes forward.

8 Claims, 11 Drawing Sheets

LAMP FOR VEHICLE

CROSS-REFERENCE TO RELATED APPLICATIONS

This application claims the benefit of priority to Korean Patent Application No. 10-2024-0041357, filed in the Korean Intellectual Property Office on Mar. 26, 2024, the entire contents of which are incorporated herein by reference.

TECHNICAL FIELD

The present disclosure relates to a lamp for a vehicle.

BACKGROUND

In general, vehicles are provided with various types of lamps that have a lighting function for easily identifying objects that are located around the vehicle during nighttime driving and a signaling function for informing other vehicles or road users of the driving states of the vehicle.

Among lamps for a vehicle, headlamps that form a low beam pattern or a high beam pattern to ensure the forward vision of the driver during nighttime driving play a very important role in safe driving.

Meanwhile, recently, external designs of the headlamp and a light distribution pattern is becoming as important as a performance of the headlamp. Accordingly, recently, slim lens units with wide shapes have been used. A conventional slim lens unit uses a method of arranging optical systems in parallel in the slim lens unit to secure a light distribution performance that is required in the lens unit of a limited height.

However, according to the conventional technology, because the separated optical systems are arranged in parallel, a discontinuous texture may occur between the unit optical systems when the lamp is turned on or not turned on, and thus, the external appearance of the lamp design may be impaired.

Accordingly, to differentiate the design of a lamp for a vehicle, it is necessary to construct an optical system that may have continuous images without causing a discontinuous texture.

SUMMARY

The present disclosure has been made to solve the above-mentioned problems occurring in the prior art while advantages achieved by the prior art are maintained intact.

An aspect of the present disclosure provides a lamp for a vehicle that may minimize a discontinuous texture of a lighting image, implement a uniform surface light emission form, and implement a continuous illumination distribution on an emission surface.

An aspect of the present disclosure also provides a lamp for a vehicle that may alleviate a discontinuous texture when the lamp is not turned on by forming a lens that forms an external appearance of the lamp, which is continuous.

An aspect of the present disclosure also provides a lamp for a vehicle that may implement a continuity of the lens even in a slim design lamp for a vehicle that extends leftward and rightward, and thus, increases a freedom of design, thereby increasing a competitiveness of the product.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle, includes a light source assembly that includes a plurality of light sources that irradiates light, and a lens that outputs the light irradiated from the light source assembly forward, the lens includes a lens body having an incident surface, to which light is input from the light source assembly, and an emission surface, from which the light input to the incident surface is output, and a plurality of lens holes formed in the lens body, and that forms specific light distribution patterns with the light irradiated from the light source assembly, and the lens body includes a guide area defined as an area located between adjacent lens holes, and that guides light traveling between the plurality of lens holes forward.

The plurality of lens holes may be provided to correspond to the plurality of light sources, focuses of the light entering the lens holes may be formed by a shape of an inner surface surrounding the lens holes of the lens body, the plurality of light distribution patterns by the plurality of lens holes may overlap each other in a light distribution area to form a low beam pattern, and the light guided by the guide area and output through the emission surface may be irradiated to an area other than the light distribution area.

The lamp may further include a plurality of condensing parts provided to correspond to the plurality of light sources, respectively, and that condenses the light irradiated from the light source, and a plurality of shield parts provided to correspond to the plurality of condensing parts, and that shields a portion of the light output from the condensing part.

An inner surface of the lens body, which surrounds the lens holes, may include a light input surface located on a side facing the incident surface, a light output surface facing the incident surface, and located on a side facing the emission surface, and a guide surface formed between the light input surface and the light output surface, and the guide area may be formed between the guide surfaces of adjacent lens holes.

When a direction facing the lens from the light source assembly or a direction facing the light source assembly from the lens is defined as a forward/rearward direction, the light input surface and the light output surface may be formed to be inclined with respect to a ground surface, on a cross-section being perpendicular to the ground surface and being parallel to the forward/rearward direction.

The light input surface and the light output surface may be formed to be inclined in a direction, in which they become more distant as they go downward.

When a direction being parallel to the ground surface and being perpendicular to the forward/rearward direction is defined as a leftward/rightward direction, a guide surface provided in any one of adjacent two lens holes is defined as a first guide surface, and a guide surface provided in the other one of the adjacent two lens holes and facing the first guide surface is defined as a second guide surface, the first guide surface and the second guide surface may be formed to be inclined in a direction, in which they become more distant as they go downward, on a cross-section being perpendicular to the ground surface and being parallel to the leftward/rightward direction.

The first guide surface and the second guide surface may be formed in a curved surface shapes having a specific curvature.

Transverse cross-sections of the first guide surface and the second guide surface may be formed in curved surface shapes being convex in a direction facing centers of the lens holes.

A width of the light output surface in a leftward/rightward direction may be formed to be greater than a width of the light input surface in the leftward/rightward direction.

BRIEF DESCRIPTION OF THE DRAWINGS

The above and other objects, features and advantages of the present disclosure will be more apparent from the following detailed description taken in conjunction with the accompanying drawings:

FIG. 4 is a top view of a lamp for a vehicle according to an embodiment of the present disclosure, and is a view illustrating a light path when the lamp is turned on;

DETAILED DESCRIPTION

Hereinafter, embodiments of the present disclosure will be described in detail according to the attached drawings.

First, the embodiments described below are suitable for understanding the technical features of the vehicle lamp of the present disclosure. However, the technical features of the present disclosure are not limited to the embodiments described or applied to the embodiments described below, and various modifications and implementations are possible within the technical scope of the present disclosure.

Figure 1:
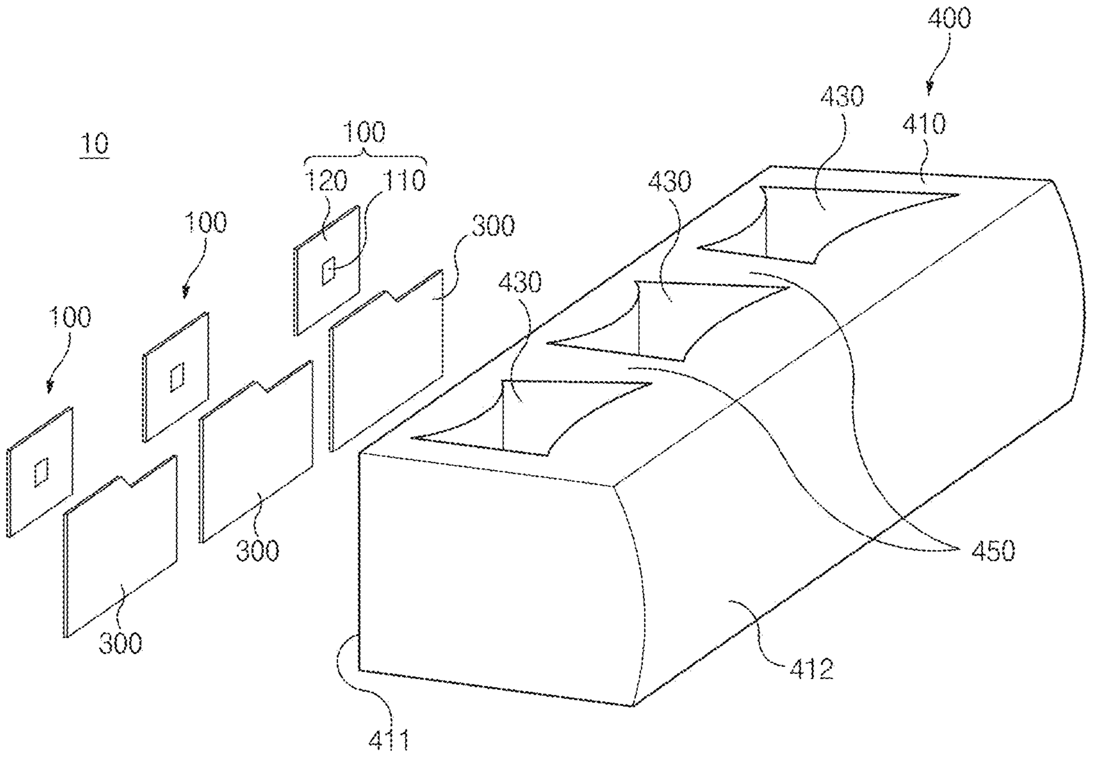
FIG. 1 is a perspective view illustrating a lamp for a vehicle according to an embodiment of the present disclosure.
Figure 2:
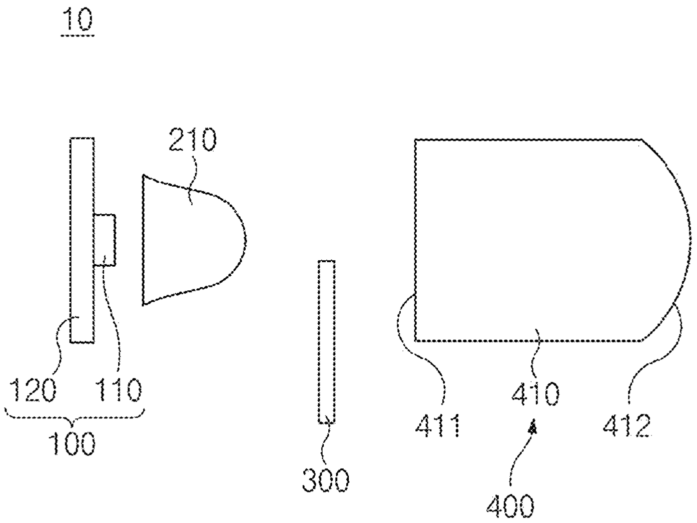
FIG. 2 is a side view of a lamp for a vehicle according to an embodiment of the present disclosure.
Figure 3:
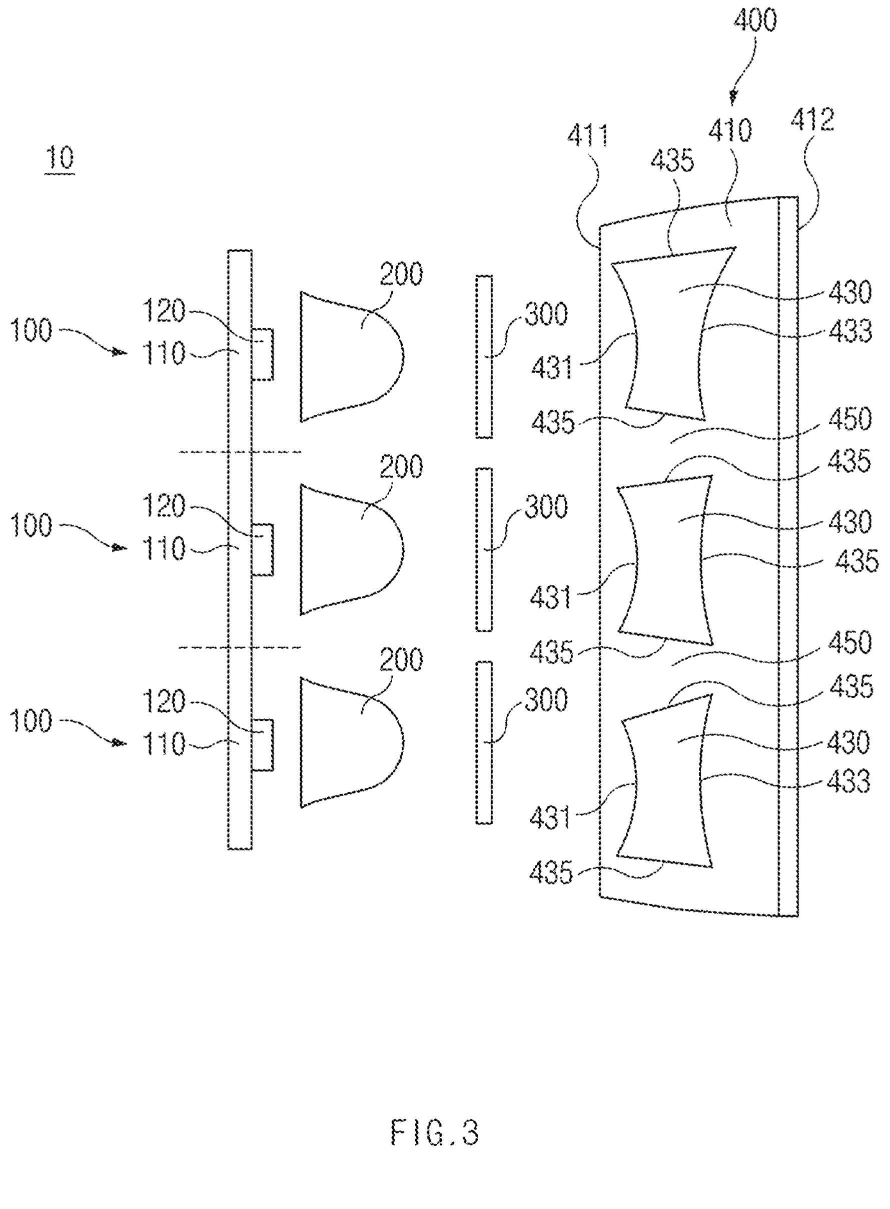
FIG. 3 is a top view of an upper surface of a lamp for a vehicle according to an embodiment of the present disclosure.
Figure 4:
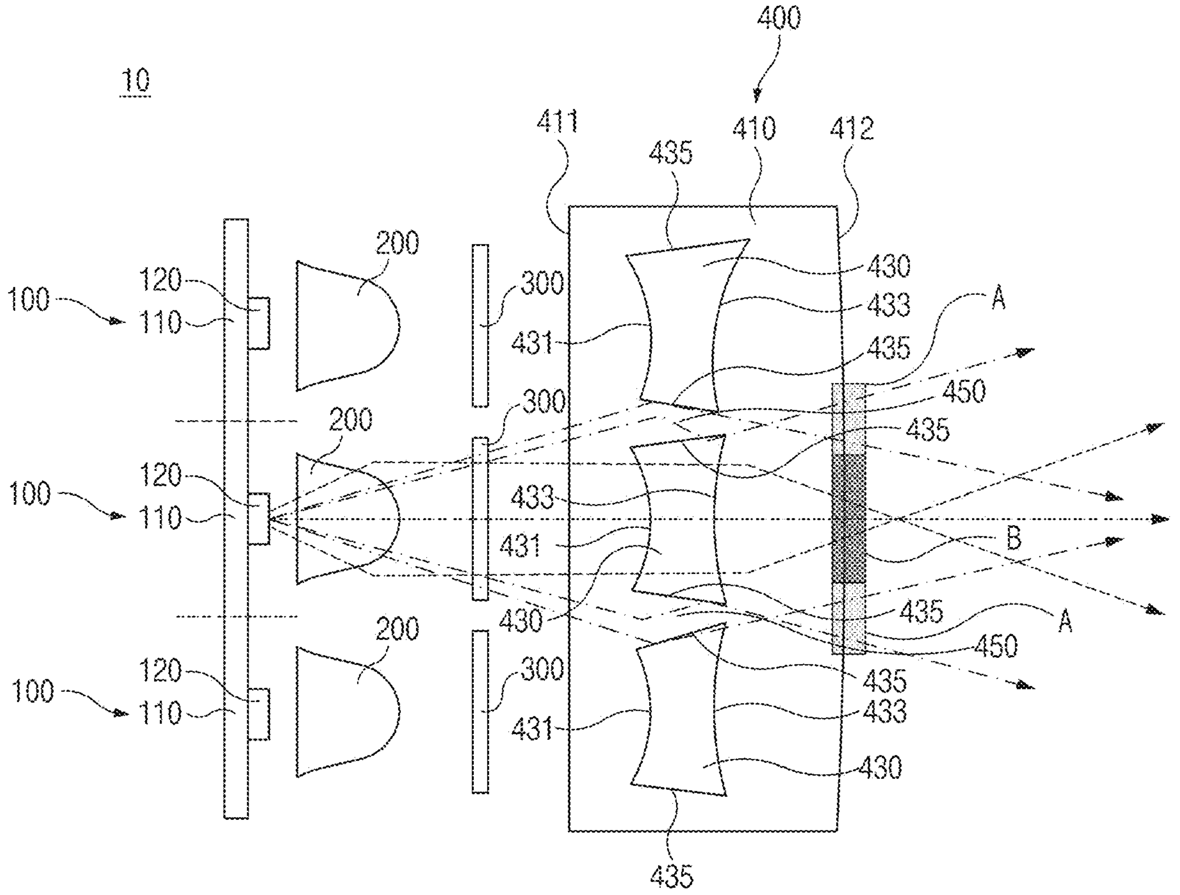

FIG. 1 is a perspective view illustrating a lamp for a vehicle according to an embodiment of the present disclosure, FIG. 2 is a side view of the lamp for a vehicle according to an embodiment of the present disclosure, FIG. 3 is a top view of an upper surface of the lamp for a vehicle according to an embodiment of the present disclosure, and FIG. 4 is a top view of the lamp for a vehicle according to an embodiment of the present disclosure, and is a view illustrating a light path when the lamp is turned on.

Figure 5:
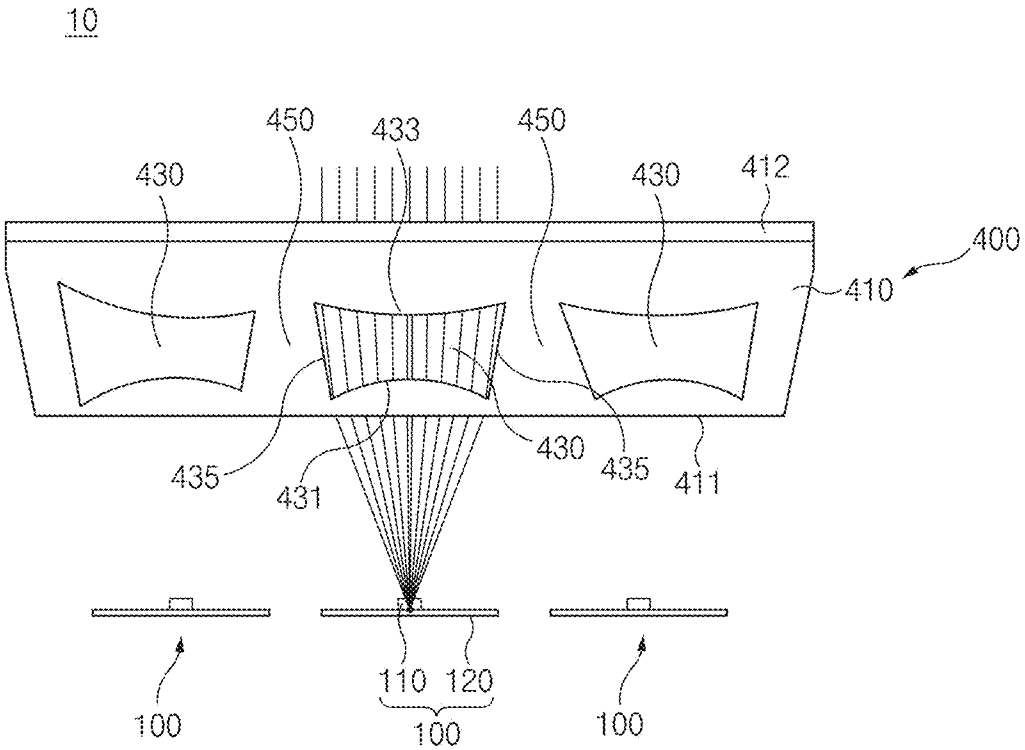
FIG. 5 is a top view of a lamp for a vehicle according to an embodiment of the present disclosure.
Figure 6:
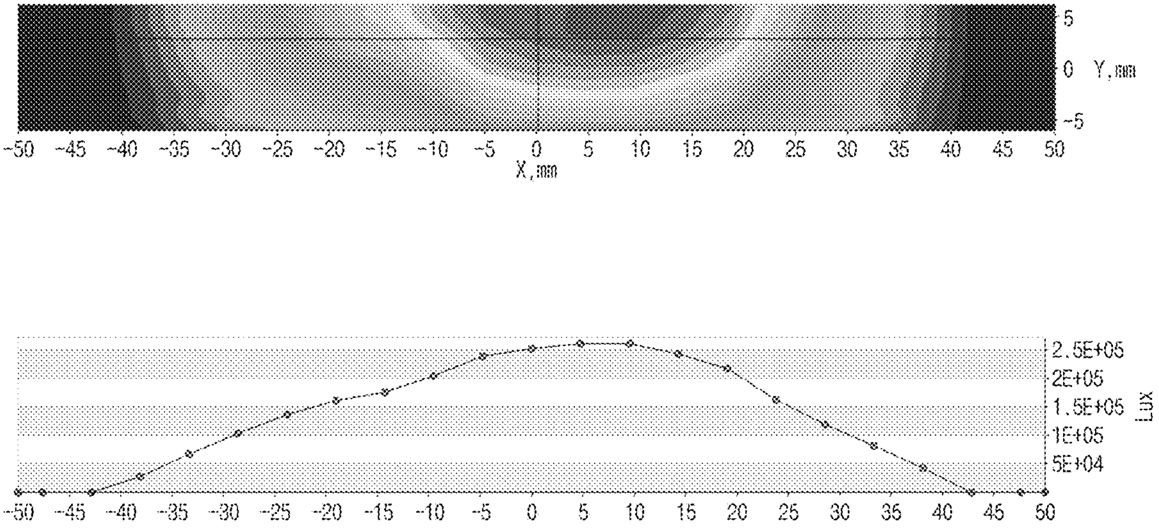
FIG. 6 is a view illustrating an illumination distribution of an emission surface of a lens when a lamp for a vehicle is turned on according to an embodiment of the present disclosure.
Figure 7:
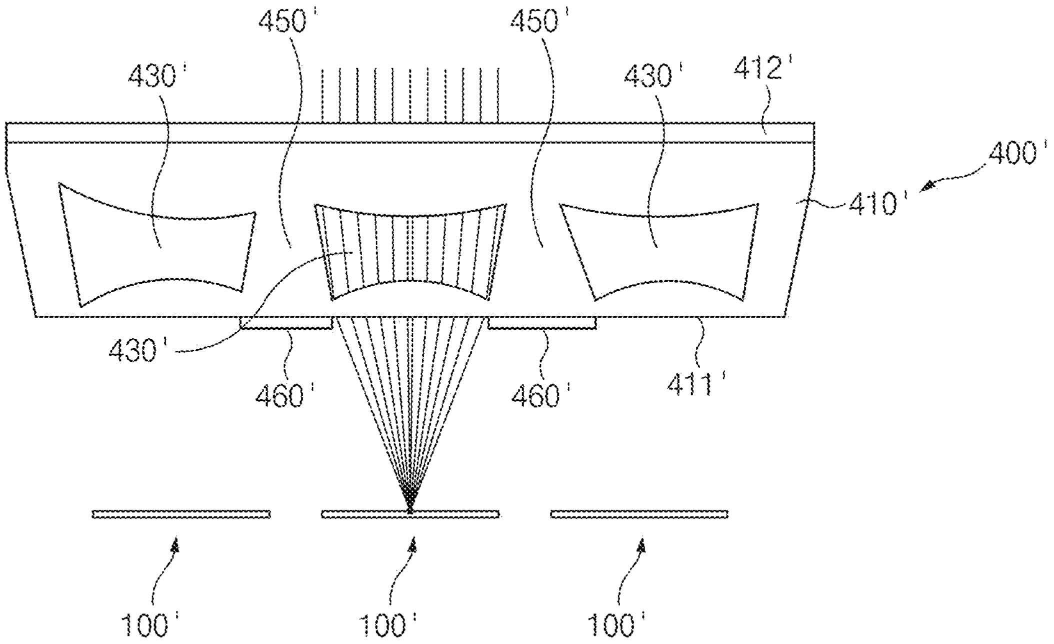
FIG. 7 is a top view of a lamp for a vehicle according to a comparative example of the present disclosure.
Figure 8:
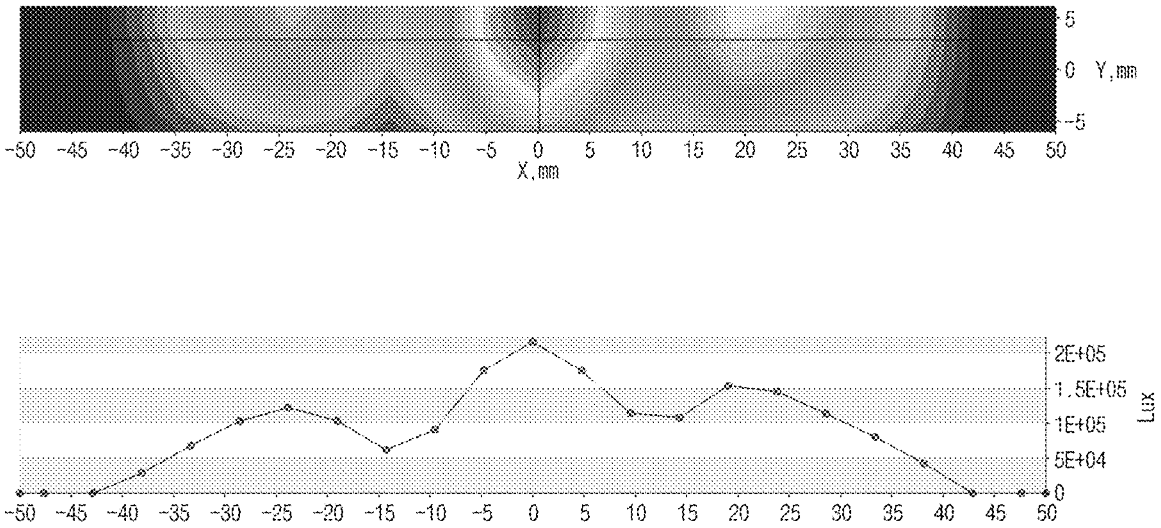
FIG. 8 is a view illustrating an illumination distribution of an emission surface of a lens when a lamp for a vehicle is turned on according to a comparative example of the present disclosure.
Figure 9:
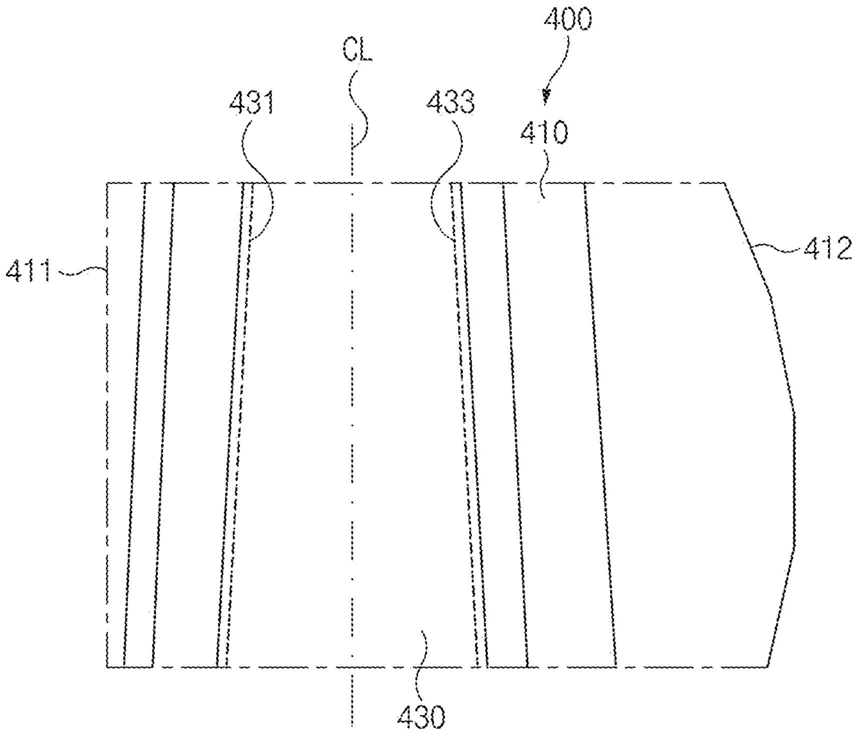
FIG. 9 is a forward/rearward cross-sectional view of a lens according to an embodiment of the present disclosure, and is a view illustrating shapes of a light input surface and a light output surface.
Figure 10:
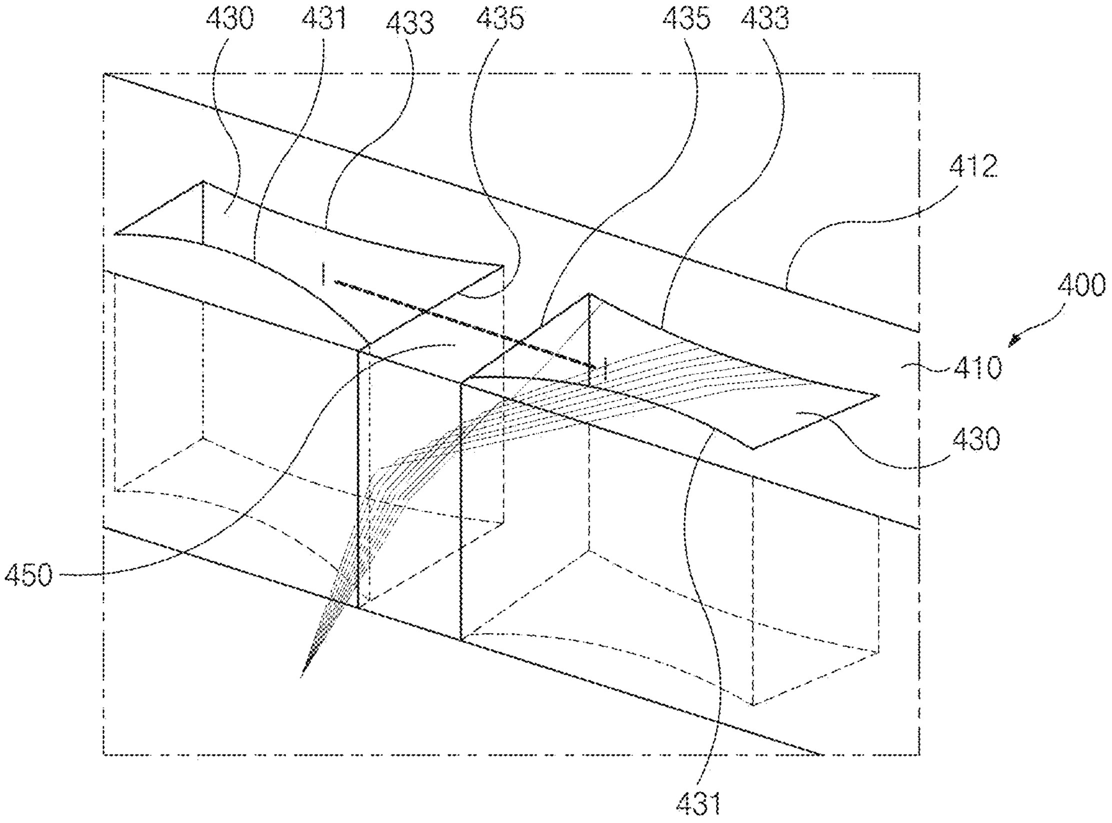
FIG. 10 is a perspective view illustrating a portion of a lens according to an embodiment of the present disclosure, and is a view illustrating a guide area and a guide surface.
Figure 11:
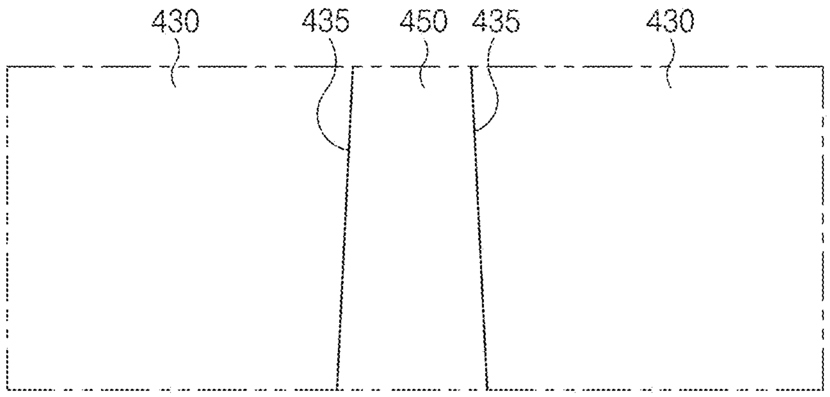
FIG. 11 is a cross-sectional view taken along line I-I of FIG. 10.

FIG. 5 is a top view of the lamp for a vehicle according to an embodiment of the present disclosure, FIG. 6 is a view illustrating an illumination distribution of an emission surface of a lens when the lamp for a vehicle is turned on according to an embodiment of the present disclosure, FIG. 7 is a top view of the lamp for a vehicle according to a comparative example of the present disclosure, FIG. 8 is a view illustrating an illumination distribution of an emission surface of a lens when the lamp for a vehicle is turned on according to a comparative example of the present disclosure, FIG. 9 is a forward/rearward cross-sectional view of the lens according to an embodiment of the present disclosure, and is a view illustrating shapes of a light input surface and a light output surface, FIG. 10 is a perspective view illustrating a portion of the lens according to an embodiment of the present disclosure, and is a view illustrating a guide area and a guide surface, and FIG. 11 is a cross-sectional view taken along line I-I of FIG. 10.

Referring to FIGS. 1 to 6 and 9 to 11, a lamp 10 for a vehicle according to an embodiment of the present disclosure includes a light source assembly 100 and a lens 400. Furthermore, an embodiment of the present disclosure may include a condensing part 200 and a shield part 300.

The light source assembly 100 is configured to irradiate light, and includes a plurality of light sources 110.

In detail, the light source assembly 100 may include the plurality of light sources 110 and a board 120, on which the light sources 110 are mounted. The light sources 110 are configured to generate and emit light, and may be light emitting diodes (hereinafter referred to as LEDs), but the present disclosure is not limited thereto. The board 120 may be a printed circuit board (PCB) 120. The plurality of light sources 110 may be spaced apart from each other on the board 120.

The plurality of light sources 110 may be provided to be disposed to be spaced apart from each other in a leftward/rightward direction as in the illustrated embodiment.

A plurality of condensing parts 200 may be provided to correspond to the plurality of light sources 110, and may be configured to condense the light irradiated from the light sources 110.

In detail, the condensing parts 200 may be configured to condense the light so that a focus is formed by the light irradiated from the light sources 110. For example, as in the illustrated embodiment, each of the condensing parts 200 may include a collimator, and the collimator may convert the light radiated from the light sources 110 into light that is parallel to an optical axis to input the light to the lens 400. However, the condensing part 200 is not limited to a collimator, and, for example, may be a reflector that condenses the light radiated from the light source assembly 100 to a focus through reflection.

A plurality of shield parts 300 may be provided to correspond to the plurality of condensing parts 200, and may be configured to shield a portion of the light output from the condensing parts 200.

In detail, the shield parts 300 may be disposed between the condensing parts 200 and the lenss 400, and may be configured to form a cut-off line in the light distribution pattern by suggesting the light irradiated from the light sources 110. Accordingly, a low beam pattern may be formed. However, an embodiment of the present disclosure does not necessarily include the shield part 300, and for example, the shield part 300 may be omitted when a high beam pattern is implemented by an embodiment of the present disclosure.

The lens 400 is configured to output the light irradiated from the light source assembly 100 forward.

In detail, the lens 400 includes a lens body 410 and a lens hole 430.

The lens body 410 has an incident surface 411, to which the light is input from the light source assembly 100, and an emission surface 412, from which the light input to the incident surface 411 is output. Furthermore, the lens hole 430 is formed in the lens body 410, and is configured to form a specific light distribution pattern with the light irradiated from the light source assembly 100.

Furthermore, the lens body 410 includes a guide area 450. The guide area 450 is an area of the lens body 410 and is defined as an area that is located between adjacent lens holes 430, and is configured to guide the light that travels between a plurality of lens holes 430 forward.

In detail, the lens body 410 forms the body of the lens 400, and may extend along a direction in which the plurality of light sources 110 are arranged. For example, in an embodiment of the present disclosure, the lens body 410 may be formed to extend long in a leftward/rightward direction.

The light irradiated from the light source assembly 100 may be input to the incident surface 411, and the incident surface 411 may be formed to be continuous to a rear surface of the lens body 410. The light input to the incident surface 411 may be output from the emission surface 412, and the emission surface 412 may be formed to be continuous to a front surface of the lens body 410. For example, a longitudinal cross section of the emission surface 412 may be formed to have a shape that is convex forward, but a shape of the emission surface 412 is not limited thereto.

The lens hole 430 may be formed in the lens body 410. That is, a hollow part is defined in the lens body 410 by the lens hole 430. A plurality of lens holes 430 may be provided, and may be formed to be spaced apart from each other along an arrangement direction of the plurality of light sources 110.

For example, the plurality of lens holes 430 may be provided to correspond to the plurality of light sources 110. Furthermore, the light that enters the lens holes 430 may be focused by a shape of the inner surface of the lens body 410, which surrounds the lens holes 430.

In detail, the inner surface surrounding the lens holes 430 defines the lens body 410, and a portion of these inner surface may serve as an output lens that forms a focus. The lens holes 430 and the inner surface may form a predetermined light distribution pattern with the light irradiated from the light source assembly 100. Hereinafter, for convenience of description, an area, in which the light distribution pattern is formed by the light that passes through the lens hole 430, is defined as a light distribution area.

In an embodiment of the present disclosure, the plurality of lens holes 430 and the inner surface, which serve as an output lens are formed in one lens body 410, and the incident surface 411 and the emission surface 412 are formed to be continuously to each other. When not illuminated by a die, the emission surface 412 of the lens 400 may implement a continuous lamp design.

The guide area 450 is an area of the lens body 410, and is an area that is formed between the plurality of lens holes 430. In an embodiment of the present disclosure, the guide area 450 may serve as a light guide that guides light emitted from the light source assembly 100. That is, in an embodiment of the present disclosure, the lens holes 430 and the inner surface, which serve the output lens, are formed in the lens body 410 to be integral, and a partial area of the lens body 410 exists between the lens holes 430. The partial area is defined as a guide area 450, and the guide area 450 may serve to guide the light so that the light input to areas other than the lens holes 430 is emitted through the emission surface 412.

For example, an area of the emission surface 412 that is the light emission surface of the lens 400, in which light is emitted by the light that passes through the lens hole 430 when the lamp 10 for a vehicle is turned on, is defined as a first light emission area "A", and an area between the first light emission areas A is called a second light emission area "B", the light guided by the guide area 450 is output to the second light emission area "B" when the lamp is turned on.

Accordingly, the light that passes through the lens holes 430 in the emission surface 412 when the lamp is turned on is emitted in the first light emission area "A", and the light guided by the guide area 450 is emitted in the second light emission area "B" whereby a discontinuous texture of the emission surface 412 may be minimized when the lamp is turned on. Furthermore, the discontinuous texture of the illumination distribution of the emission surface 412 of the lens 400 may also be alleviated.

In detail, an embodiment of the present disclosure of FIGS. 5 and 6 and a comparative example of FIGS. 7 and 8 will be described by way of example. FIG. 5 is a top view of the lamp for a vehicle of the present disclosure, and FIG. 6 is a view illustrating the illumination distribution of the emission surface of the lens when the lamp for a vehicle is turned on according to an embodiment of the present disclosure. FIG. 7 is a top view of the lamp for a vehicle according to a comparative example of the present disclosure, and FIG. 8 is a view illustrating the illumination distribution of an emission surface of the lens when the lamp for a vehicle is turned on according to a comparative example of the present disclosure.

The comparative example of the present disclosure differs from an embodiment of the present disclosure in that a shield part 460' is installed to prevent the light from being input to the guide area 450.

According to an embodiment of the present disclosure illustrated in FIGS. 5 and 6, it may be seen that the illumination distribution of the emission surface 412 is continuous when the lamp is turned on, by light that passes through the guide area 450. On the other hand, according to the comparative example of FIGS. 7 and 8, because the light is shielded by the shield part 460' from being input to the guide area 450, the amount of the light emitted from the second light emitting area decreases when the lamp is turned on, and thus, an illumination distribution on the emission surface 412' may be uneven. Accordingly, according to the comparative example, a discontinuous texture may be generated in a lamp lighting image. Reference numeral 100' of FIGS. 7 and 8 denotes a light source assembly, reference numeral 400' denotes a lens, reference numerals 410', 411', and 412' denote a lens body, an incident surface, and an emission surface, respectively, reference numeral 430' denotes a lens hole, and reference numeral 450' denotes a guide area.

In this way, according to an embodiment of the present disclosure, because the light is emitted from an entire area of the continuously formed emission surface 412 when the lamp is turned on, the discontinuous texture of the lighting image may be minimized and a uniform surface light emission form may be achieved, and a continuous illumination distribution may be implemented on the emission surface 412.

In addition, according to an embodiment of the present disclosure, the lens 400 that forms an external appearance of the lamp is continuous, and thus, a discontinuous texture may be alleviated when the lamp is not turned on.

Furthermore, according to an embodiment of the present disclosure, a shield structure that is installed to prevent light interference in a conventionally divided lens is unnecessary, and thus, the number of parts may be reduced and a simple structure may be achieved.

Accordingly, according to an embodiment of the present disclosure, even in a lamp 10 for a vehicle with a slim design that extends leftward and rightward, a continuity of the lens may be implemented, whereby a freedom of design increases and accordingly, a competitiveness of the product increases.

Meanwhile, for example, a plurality of light distribution patterns formed by the plurality of lens holes 430 may overlap in the light distribution area to form a low beam pattern. For example, the plurality of lens holes 430 may have different shapes, and thus, the light that passes through the lens holes 430 may overlap in the light distribution area to form a low beam pattern.

Meanwhile, the light that is guided by the guide area 450 and output through the emission surface 412 may be configured to be irradiated to an area other than the light distribution area. This may be implemented by a shape of the lens body 410, which is a surface that surrounds the guide area 450.

Accordingly, the light that passes through the guide area 450 may only serve to implement a continuous lighting image of the emission surface 412 that is a light emission surface when the lamp is turned on, and may not influence the image of the light distribution pattern implemented in the light distribution area and the light distribution performance, and the like. However, the characteristics of the light that passes through the guide area 450 and the emission surface 412 are not limited to the above.

Meanwhile, the inner surface of the lens body 410, which surrounds the lens hole 430, may include a light input surface 431 that is located on a side that faces the incident surface 411, a light output surface 433 that faces the incident surface 411 and is located on a side that faces the emission surface 412, and a guide surface 435 that is formed between the light input surface 431 and the light output surface 433, and the guide area 450 may be formed between the guide surfaces 435 of adjacent lens holes 430.

In detail, the shape of the lens holes 430 may be determined by the light input surface 431, the light output surface 433, and the pair of guide surfaces 435. Furthermore, the focus of the light input to the lens hole 430 may be formed by the light input surface 431 and the light output surface 433. Furthermore, a path of the light input to the guide area 450 may be formed by the shape of the guide surface 435.

For example, a transverse cross-section of the light input surface 431 may be formed as a curved surface that is convex in a direction that faces the center of the lens hole 430. Furthermore, the transverse cross-section of the light output surface 433 may be formed as a curved surface that is convex in a direction that faces the center of the lens hole 430. The curvatures of the light input surface 431 and the light output surface 433 are the same or different.

Referring to FIG. 9, when a direction that faces the lens 400 from the light source assembly 100 or a direction that faces the light source assembly 100 from the lens 400 is defined as a forward/rearward direction, the light input surface 431 and the light output surface 433 may be formed to be inclined with respect to the ground, on a cross-section that is perpendicular to a ground surface and parallel to the forward/rearward direction.

In this way, the light input surface 431 and the light output surface 433 are formed to be inclined to be perpendicular to each other, and thus, the light emission image of the lamp or the light distribution pattern image that is formed through the light that passes through the lens hole 430 may be variously implemented.

For example, as in the illustrated embodiment, the light input surface 431 and the light output surface 433 may be formed to be inclined in a direction, in which they become more distant as they go downward.

In addition, as in the illustrated embodiment, the light input surface 431 and the light output surface 433 according to the present disclosure will be formed to be symmetrical to each other with respect to a center line CL of the lens hole 430 in the forward/rearward direction, on a longitudinal cross-section. Then, a curvature of the transverse curves of the light input surface 431 and the light output surface 433 may be different, but the longitudinal inclinations thereof may be symmetrical to each other. However, the inclinations of the light input surface 431 and the light output surface 433 are not limited to being symmetrical, and may be formed in various asymmetries or with various inclinations depending on the design specifications of the lamp 10 for a vehicle.

Meanwhile, hereinafter, a direction that is parallel to the ground surface and perpendicular to the forward/rearward direction will be designed as the leftward/rightward direction, the guide surface 435 that is provided in any one of the two adjacent lens holes 430 will be defined as a first guide surface 435, and the guide surface 435 that is provided in the other one of the two adjacent lens holes 430 and faces the first guide surface 435 will be defined as a second guide surface 435.

Referring to FIGS. 10 and 11, then, on a cross-section that is perpendicular to the ground surface and parallel to the leftward/rightward direction, the first guide surface 435 and the second guide surface 435 may be formed to be inclined in a direction, in which the become more distant as they go downward. A portion of the light that is input to the incident surface 411 and enters the guide area 450 may be reflected through total reflection from the first guide surface 435 and the second guide surface 435 and be guided to the second light distribution area.

Then, the inclinations of the first guide surface 435 and the second guide surface 435 may be determined by considering the path of light input to the guide area 450. For example, the inclinations of the first guide surface 435 and the second guide surface 435 may be formed to guide the light to prevent glare caused by the light emitted through the second light distribution area.

Furthermore, the inclinations of the first guide surface 435 and the second guide surface 435 may allow the light that is guided by the guide area 450 to be emitted through the second light emission area "B" to be guided an area other than the light distribution area, which is an area, in which the light emitted through the first light emission area "A" is irradiated.

Meanwhile, the first guide surface 435 and the second guide surface 435 may be formed in a curved shape with a specific curvature.

In more detail, the transverse cross-sections of the first guide surface 435 and the second guide surface 435 may have curved shape that are convex in a direction that faces the center of the lens hole 430 or concave in a direction that faces the guide area 450. That is, the first guide surface 435 and the second guide surface 435 according to an embodiment of the present disclosure may be formed to have specific inclinations in a longitudinal direction, and may be formed in a curved shape in a transverse direction.

Here, curvatures of the curved surfaces of the first guide surface 435 and the second guide surface 435 in the transverse direction may be determined by considering the path of light that passes through the guide area 450, and may be changed depending on the design specifications of the lamp 10 for a vehicle.

Meanwhile, referring to FIGS. 3 to 5, a width of the light output surface 433 in the leftward/rightward direction may be larger than a width of the light input surface 431 the leftward/rightward direction.

Accordingly, the guide area 450 may be formed to be smaller on a side of the emission surface 412 than on a side of the incident surface 411. In this case, a greater amount of light may enter the guide area 450, and thus, the amount of the light guided to the second light emission area "B" may be increased. As described above, the lens holes 430 may be formed at locations corresponding to the light sources 110, and thus, the amount of the light that passes through the lens holes 430 may be greater than the amount of the light that passes through the guide area 450. Then, by increasing an area of the guide area 450, which is close to the input side, and decreasing an area that is close to the emission side, the amount of the light guided forward by the guide area 450 may be increased so that, when the lamp is turned on, a discontinuous texture on the light emission surface 412 may be minimized.

Accordingly, the amount of light that passes through the guide area 450 and is emitted from the second light emission area "B" that is an area between the first light emission areas "A" may be increased. Accordingly, a uniformity of brightness of the first light emission area "A" and the second light emission area "B" may be improved.

However, considering the arrangement of the light source assembly and the lens holes according to an embodiment of the present disclosure, the amount of the light that passes through the lens holes is much greater than the amount of the light that passes through the guide area, and thus, an influence of the shape, in which the area of the guide area on the exit side is smaller than the area on the input side, on the light distribution performance of the light distribution pattern formed by the light that passes the lens holes, and the optical efficiency, may be small.

In this way, according to an embodiment of the present disclosure, the light is emitted from the entire area of the continuously formed emission surface when the lamp is turned on, the discontinuous texture of the lighting image may be minimized and a uniform surface light emission form may be implemented, a continuous illumination distribution may be implemented on the emission surface. Furthermore, according to an embodiment of the present disclosure, the lens that forms the external appearance of the lamp is made to be continuous so that the discontinuous texture may be alleviated when the lamp is not turned on.

In this way, according to an embodiment of the present disclosure, a discontinuous texture of a lighting image may be minimized, a uniform surface light emission form may be implemented, and a continuous illumination distribution on the emission surface may be implemented.

According to an embodiment of the present disclosure, a discontinuous texture may be alleviated when the lamp is not turned on by forming a lens that forms an external appearance of the lamp, which is continuous.

In this way, according to an embodiment of the present disclosure, a discontinuous texture of a lighting image may be minimized, a uniform surface light emission form may be implemented, and a continuous illumination distribution on the emission surface may be implemented.

According to an embodiment of the present disclosure, a discontinuous texture may be alleviated when the lamp is not turned on by forming a lens that forms an external appearance of the lamp, which is continuous.

According to an embodiment of the present disclosure, a continuity of the lens may be implemented even in a slim design lamp for a vehicle that extends leftward and rightward, and thus, a freedom of design may be increased whereby a competitiveness of the product may be increased.

According to an embodiment of the present disclosure, a continuity of the lens may be implemented even in a slim design lamp for a vehicle that extends leftward and rightward, and thus, a freedom of design may be increased whereby a competitiveness of the product may be increased.

Although specific embodiments of the present disclosure have been described in detail above, the spirit and scope of the present disclosure are not limited to the specific embodiments, and various modifications and variations may be made by those of ordinary skill in the art, to which the present disclosure pertains, without changing the gist of the present disclosure.

What is claimed is:

1. A lamp for a vehicle, comprising:

a light source assembly that includes a plurality of light sources configured to irradiate light; and a lens configured to direct the light output from the plurality of light sources of the light source assembly in a forward direction, wherein the lens includes:

a lens body having an incident surface to which light is input from the light source assembly and an emission surface from which the light input to the incident surface is output; and a plurality of lens holes formed in the lens body and configured to form specific light distribution patterns using the light from the light source assembly, wherein the lens body includes:

a guide area located between adjacent lens holes and configured to guide light traveling between the adjacent lens holes in the forward direction; and a plurality of condensing parts corresponding to the plurality of light sources, respectively, and configured to condense light irradiated from respective ones of the plurality of light sources; and a plurality of shield parts corresponding respectively to the plurality of condensing parts and configured to shield a portion of light output from a respective condensing part.

2. The lamp of claim 1, wherein:

the plurality of lens holes correspond respectively to the plurality of light sources, a focus of light entering each lens hole is formed by a shape of a light input surface of the lens holes of the lens body, light distribution patterns caused by the lens holes overlap each other in a light distribution area to form a low beam pattern, and light guided by the guide area and output through the emission surface is directed to an area other than the light distribution area.

3. The lamp of claim 1, wherein the lens body, which surrounds the lens holes, includes:

a light input surface located on a side of each lens hole facing the incident surface;

a light output surface located on a side of each lens hole facing the emission surface; and guide surfaces in each lens hole formed between the light input surface and the light output surface of the lens hole, wherein the guide area is formed between the guide surfaces of adjacent lens holes.

4. The lamp of claim 3, wherein, when a direction facing the lens from the light source assembly or a direction facing the light source assembly from the lens is defined as a forward/rearward direction, the light input surface and the light output surface are formed to be inclined with respect to a ground surface on a cross-section thereof perpendicular to the ground surface and parallel to the forward/rearward direction.

5. The lamp of claim 4, wherein, when a direction parallel to the ground surface and perpendicular to the forward/rearward direction is defined as a leftward/rightward direction, a guide surface provided in any one of two adjacent lens holes is defined as a first guide surface, and a guide surface provided in another of the two adjacent lens holes and facing the first guide surface is defined as a second guide surface, and wherein the first guide surface and the second guide surface are formed to be inclined in a direction in which a separation therebetween increases in a direction perpendicular to the ground surface and parallel to the leftward/rightward direction.

6. The lamp of claim 3, wherein a width of the light output surface in a leftward/rightward direction is formed to be greater than a width of the light input surface in the leftward/rightward direction.

7. A lamp for a vehicle, comprising:

a light source assembly that includes a plurality of light sources configured to irradiate light; and a lens configured to direct the light output from the plurality of light sources of the light source assembly in a forward direction, wherein the lens includes:

a lens body having an incident surface to which light is input from the light source assembly and an emission surface from which the light input to the incident surface is output; and a plurality of lens holes formed in the lens body and configured to form specific light distribution patterns using the light from the light source assembly, wherein the lens body includes a guide area located between adjacent lens holes and configured to guide light traveling between the adjacent lens holes in the forward direction;

wherein the lens body, which surrounds the lens holes, includes a light input surface located on a side of each lens hole facing the incident surface, and a light output surface located on a side of each lens hole facing the emission surface; and wherein the light input surface and the light output surface are inclined in a direction in which a separation therebetween increases.

8. A lamp for a vehicle, comprising:

a light source assembly that includes a plurality of light sources configured to irradiate light; and a lens configured to direct the light output from the plurality of light sources of the light source assembly in a forward direction, wherein the lens includes:

a lens body having an incident surface to which light is input from the light source assembly and an emission surface from which the light input to the incident surface is output; and a plurality of lens holes formed in the lens body and configured to form specific light distribution patterns using the light from the light source assembly, wherein the lens body includes a guide area located between adjacent lens holes and configured to guide light traveling between the adjacent lens holes in the forward direction;

wherein the lens body, which surrounds the lens holes, includes a light input surface located on a side of each lens hole facing the incident surface, a light output surface located on a side of each lens hole facing the emission surface, and first and second guide surfaces in each lens hole formed between the light input surface and the light output surface of the lens hole; and wherein the first guide surface and the second guide surface are each formed as a curved surface.

* * * * *